Sept. 4, 1962  P. VIDAL ET AL  3,052,557

METHOD AND APPARATUS FOR FREEZING LIQUID FOOD PRODUCTS

Filed Nov. 12, 1958

3,052,557
METHOD AND APPARATUS FOR FREEZING
LIQUID FOOD PRODUCTS
Pierre Vidal, Charbonnieres-les-Bains, René Mignot, Caluire, and Lucien Brunelet, Lyon, France; said Mignot and Brunelet assignors to said Vidal
Filed Nov. 12, 1958, Ser. No. 773,518
Claims priority, application France Nov. 13, 1957
6 Claims. (Cl. 99—192)

The present invention relates to an industrial process for freezing liquid food products, such as milk, fruit and meat juices and the like, in view of their preservation either in the form of snow or as cakes resulting from the compression of the latter and their storing, in this condition, for subsequent further treatment, at a later selected period.

One of the main difficulties experienced in this kind of processes is the so-called sedimentation (or the settling of solid particles from the liquid through deposit), this tendency preventing a sufficiently homogeneous frozen product to be obtained.

It is an object of the present invention to provide a simple and improved process, free of the disadvantage mentioned above.

A further object of the invention is the provision of a simple and efficient equipment for carrying this process into effect.

According to the invention, the process consists substantially in causing the liquid to be frozen, preferably pre-homogenized and pre-sterilized (or pasteurized), while being carried to a temperature not lower than 10° C., to fall down in droplets into a cylindrical container or similar vessel of a flexible material, having a vibratory motion; such vessel ensures both the freezing of the liquid and the removal of the snow-like product obtained.

The apparatus according to the invention essentially comprises means for atomizing the liquid to be frozen, into a substantially vertical elongated container of a flexible material, open at its bottom; means for causing said container to vibrate and a cooling air-stream to circulate therethrough and means for collecting the snow-like product obtained.

Figure 1:
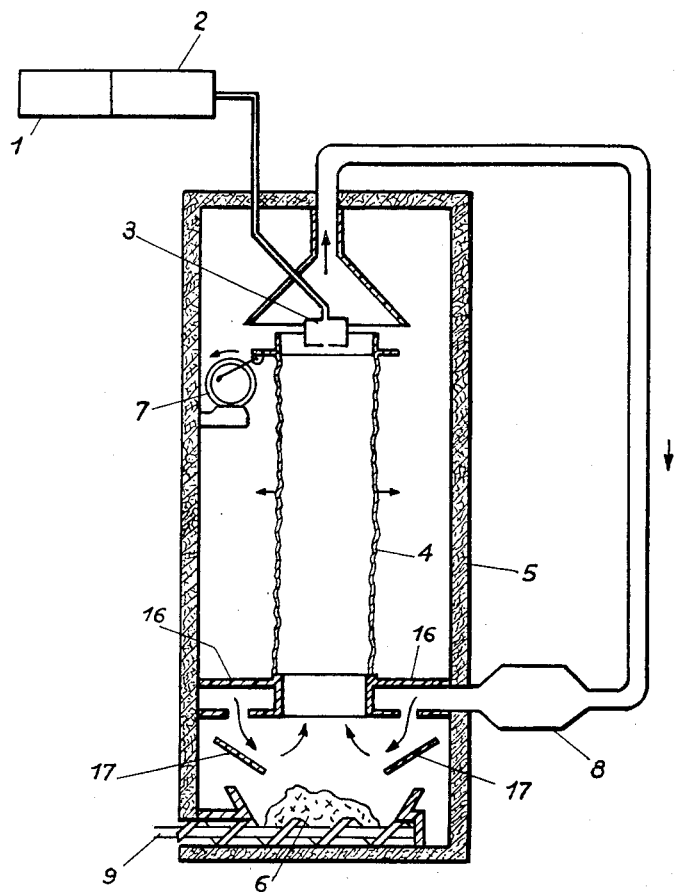
Figure 2:
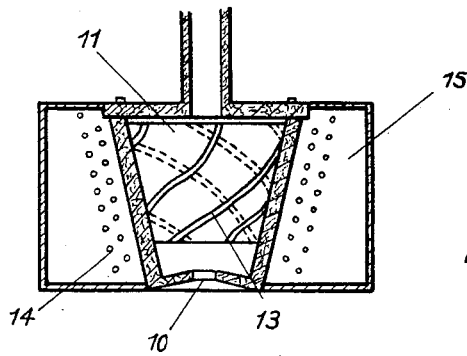

The invention will be better understood from the following description and the appended drawing, wherein:

FIG. 1 diagrammaticaly illustrates a non limitative embodiment of the apparatus according to the invention, as applied more particularly to the production of milk in snow form;

FIG. 2 is a schematic view of an atomizer or sprayer, used in conjunction with the device illustrated in FIG. 1.

Referring to FIG. 1, a homogenizer 1, a sterilizing apparatus 2 and an atomizer 3 are shown in block form in the drawing. The atomizer (FIGURE 2), which is of a conventional type, comprises a calibrated outlet 10, preceded by a stationary guiding device 11 containing a helical blading, located in a nozzle 13 heated by an electrical resistance 14 thermally isolated by a sleeve 15, (this resistance is necessary, since the heat carried by the liquid milk is not sufficient to maintain the device in a normal operating condition).

The essential member of the device according to the invention is a vertical cylinder 4, several meters long, made for instance of polyethylene—or any other convenient flexible material—such as stainless metal sheet, corrugated in order to increase the flexibility thereof—and fixed at its bottom to a carrier housing 5 which also serves as a collecting chamber for the snow-like milk 6. Housing 5 is conveniently lagged and cooled by means not illustrated and which are well known in the art. A shaking device generally indicated by block 7 imparts a vibratory movement to cylinder 4. A cooler 8 ensures the flow of air therethrough, at a temperature of −25 to −30° C., in the direction of the arrow-heads.

The cooler 8, of conventional type, emerges at the bottom of cylinder 4 into an annular cold-air inlet 16 which, in conjunction with deflector arrangements 17, of convenient type, enables an optimum distribution of air to be obtained, the air thus penetrating in substantially vertical stream lines into cylinder 4.

The device described operates as follows:

The liquid—milk in the example considered herein—is fed in droplets at the top of the cylinder, at a temperature of about +10° C., for instance, sufficiently low to promote subsequent freezing, but high enough to prevent any substantial sedimentation before complete freezing of the liquid. Besides, the atomizer 3 being heated as previously mentioned, no sedimentation may occur at outlet of jet 10, provided the dimension thereof is such that the outlet speed of the milk is superior to the time required by the milk to solidify.

Instantaneous freezing is then obtained in cylinder 4, facilitated by the continuous discharge of milk in snow form under the effect of the vibrating cylinder. Milk in this form is evacuated at 9, either into a bagging or sacking apparatus, for further preservation, or into presses for the manufacturing of solid milk cakes, and further eventual processing.

The equipment described hereinbefore by way of a non limitative example—and wherein various modifications and adaptations may be carried out without departing from the spirit and scope of the invention—enables milk in powder form to be readily and simply manufactured, on an industrial scale.

It is important to note that, in practice, use is preferably made of a multiple jet atomizer, since spraying of the milk must be effected as finely as possible to avoid any selective solidification and the output of a single jet would generally be unsufficient.

Other types of atomizers, different from those described and illustrated, may also be used; it is however of more advantage to employ nozzle type atomizers, yielding much better results than centrifugal type sprayers.

It is moreover to be understood that although this invention has been described in relation with the production of milk in snow form, the equipment and process used, may be adapted and applied to freezing of other products in liquid form, as, for instance, fruit juices.

What is claimed is:

1. The method of freezing liquid food products, which includes the steps of atomizing the liquid to be frozen and of feeding the atomized liquid at a temperature just high enough for preventing any sedimentation of the liquid down into an ascending cooling air stream, while simultaneously submitting said atomized liquid and the resulting frozen product to vibratory motion.

2. The method of manufacturing snow-like milk, which includes the steps of homogenizing and pasteurizing the liquid milk, of carrying it at a temperature not lower than 10° C., of atomizing it and feeding the atomized liquid down into an ascending air stream, the temperature of said air being of about −25° to −30° C., while simultaneously submitting the atomized liquid and the resulting snow to a vibratory motion.

3. An apparatus for freezing liquid food products, comprising: means for atomizing the liquid to be frozen, means for keeping said liquid at a temperature just high enough for preventing any sedimentation thereof, a substantially vertical elongated container of a flexible material, having lateral walls, a top end and a bottom end, said atomizing means being connected to said top end, whereby the atomized liquid is fed into said container; means for imparting a vibratory motion to said lateral wall; and means for causing a cooling air stream to circulate in said container upwardly from said bottom.

4. An appartaus for manufacturing snow-like milk comprising: means for homogenizing and pasteurizing the liquid milk; means for carrying it to a comparatively low temperature not lower than 10° C.; means for atomizing said liquid milk; a vertical elongated cylinder having a lateral wall made of flexible material, and open top and bottom ends, said atomizing means being located at said top end; means for vibrating said lateral wall, and means for causing a cooling air stream to circulate into said cylinder from said bottom end to said top end.

5. An apparatus as claimed in claim 4, in which said atomizing means essentially consist of a multiple jet nozzle type atomizer, including an electrical heating resistor.

6. The method of freezing milk into milk snow comprising the steps of atomizing milk at a temperature lower than the sedimentation temperature of milk and projecting thereafter said milk into a downward direction against an ascending stream of air at freezing temperature.

References Cited in the file of this patent

UNITED STATES PATENTS

| | | |
|---|---|---|
| 1,193,173 | Merrell | Aug. 1, 1916 |
| 1,927,175 | Josephson | Sept. 19, 1933 |
| 1,970,437 | Snitkin | Aug. 14, 1934 |
| 1,976,204 | Voorhees et al. | Oct. 9, 1934 |
| 2,020,719 | Bottoms | Nov. 12, 1935 |
| 2,412,203 | Brunkhurst | Dec. 10, 1946 |